(12) United States Patent
Vilakkumadathil (10) Patent No.: US 9,244,809 B1
(45) Date of Patent: Jan. 26, 2016

(54) VALIDATING CODE OF AN EXTRACT, TRANSFORM AND LOAD (ETL) TOOL

(71) Applicant: INTERNATIONAL BUSINESS MACHINES CORPORATION, Armonk, NY (US)

(72) Inventor: Rokky Vilakkumadathil, Manjeri (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/331,647

(22) Filed: Jul. 15, 2014

(51) Int. Cl.
*G06F 9/45* (2006.01)
*G06F 11/36* (2006.01)
*G06F 9/445* (2006.01)

(52) U.S. Cl.
CPC ........ *G06F 11/3604* (2013.01); *G06F 9/44589* (2013.01)

(58) Field of Classification Search
None
See application file for complete search history.

(56) References Cited

U.S. PATENT DOCUMENTS

| | | | | |
|---|---|---|---|---|
| 8,386,419 | B2 * | 2/2013 | Yalamanchilli | 707/602 |
| 8,826,240 | B1 * | 9/2014 | Lachwani et al. | 717/126 |
| 2003/0056195 | A1 * | 3/2003 | Hunt | 717/116 |
| 2006/0123389 | A1 * | 6/2006 | Kolawa et al. | 717/101 |
| 2007/0239769 | A1 * | 10/2007 | Fazal et al. | 707/102 |
| 2008/0140537 | A1 * | 6/2008 | Powell | 705/26 |
| 2008/0195430 | A1 * | 8/2008 | Rustagi | 705/7 |
| 2008/0307262 | A1 * | 12/2008 | Carlin, III | 714/37 |
| 2008/0307430 | A1 * | 12/2008 | Friedlander et al. | 719/313 |
| 2010/0325569 | A1 * | 12/2010 | King et al. | 715/771 |
| 2011/0047525 | A1 * | 2/2011 | Castellanos et al. | 717/104 |
| 2011/0265061 | A1 * | 10/2011 | Moore | 717/106 |
| 2011/0296391 | A1 * | 12/2011 | Gass et al. | 717/168 |
| 2012/0017280 | A1 * | 1/2012 | Wiegenstein et al. | 726/25 |
| 2012/0324419 | A1 * | 12/2012 | Roberts et al. | 717/102 |
| 2013/0151491 | A1 * | 6/2013 | Gislason | 707/696 |
| 2013/0152047 | A1 * | 6/2013 | Moorthi et al. | 717/124 |
| 2013/0173529 | A1 * | 7/2013 | Erla et al. | 707/602 |
| 2013/0246376 | A1 * | 9/2013 | Padmanabhan et al. | 707/694 |
| 2014/0059561 | A1 * | 2/2014 | Grasselt et al. | 718/104 |
| 2014/0279934 | A1 * | 9/2014 | Li et al. | 707/687 |
| 2014/0358845 | A1 * | 12/2014 | Mundlapudi et al. | 707/602 |
| 2015/0020049 | A1 * | 1/2015 | Caufield et al. | 717/124 |
| 2015/0026136 | A1 * | 1/2015 | Rathod et al. | 707/692 |
| 2015/0046389 | A1 * | 2/2015 | Dhayapule et al. | 707/602 |
| 2015/0058278 | A1 * | 2/2015 | Fankhauser et al. | 707/602 |
| 2015/0100542 | A1 * | 4/2015 | Li et al. | 707/602 |

* cited by examiner

*Primary Examiner* — Isaac T Tecklu
(74) *Attorney, Agent, or Firm* — Schmeiser, Olsen & Watts; John Pivnichny (57) ABSTRACT

An approach for validating code for an extract, transform and load (ETL) tool is provided. Naming, coding, and performance standards for the code is received. The code is exported to a job definition file and parsed. Violations of the standards are determined by determining the parsed code does not match the standards. A report identifying the violations is generated. Based on a review of the report and a rework of the code to comply with the standards, the reworked code is exported to another job definition file and parsed, the parsed reworked code is determined to not include the violations of the standards, and a second report is generated that indicates that the reworked code does not include the violations. An approval of the reworked code is received based on the second report.

17 Claims, 6 Drawing Sheets

PARALLEL JOBS — 300 / 302

| Job Name | ... | Agg. Count | Trans. Count | Re-Part. Count | Sort Count | Ann. Count Ratio | DB R/W Count | File R/W Count | Hard-coding Count | Stds. Violation Count |
|---|---|---|---|---|---|---|---|---|---|---|
| ADS010_Load_ADS... | | 0 | 1 | 0 | 0 | 0.75 (4) | 1 | 0 | 0 | 0 |
| AIE001WriteSAPFile | | 8 | 6 | 6 | 7 | 22 (2) | 3 | 5 | 0 | 59 |
| AIE002WriteSAPFile1 | | 0 | 1 | 1 | 1 | 2 (2) | 0 | 2 | 0 | 10 |
| AIS001DataValidation | | 1 | 3 | 0 | 2 | 2.25 (4) | 4 | 0 | 0 | 28 |
| AIS001EnrichmentAIS... | | 1 | 4 | 7 | 1 | 6.2 (5) | 9 | 0 | 0 | 36 |
| AIS001ExtractAIS... | | 0 | 2 | 0 | 0 | 2.25 (4) | 2 | 3 | 0 | 11 |
| ... | | | | | | | | | | |

SEQUENCE JOBS — 304

| Sequence Name | ... | Stage Count | Param. Count | Ann. Count | Hard-coding Count | Stds. Violation Count |
|---|---|---|---|---|---|---|
| GEN001LandingFileProcessing | | 15 | 7 | 1 | 0 | 23 |
| GEN001StartMonitoringFiles | | 3 | 7 | 1 | 0 | 7 |
| GEN004TerminateMasterScript | | 1 | 2 | 1 | 0 | 3 |
| ... | | | | | | |

*FIG. 3*

| DSX Line No. | Object Type | Object Name | Stage Name | Error Description | String Looked For | DSX Line |
|---|---|---|---|---|---|---|
| 7192 | Parallel Job | ATL201File Reciept | DB_Select_ SIL_CTRL_ Batch_Exec | Database HardCoding | SOL2DEV | <?xml version='1.0' encoding="UTF-16'?> <Properties version='1.1' .... <![CDATA[insert into SIL.SIL_CTRL_Batch_Exec(Batch_ID, Business_Date,Job_Start_Date_Time,Job_ End_Date_Time,User_Name,Job_ID,Serial_ No) values (0,CONVERT (date, GETDATE()), {fn NOW()},{fn NOW()},'sol2dev',(select Job_ID from SIL.SIL_CTRL_Job_Defn where Job_Name ='ATL201FileReciept'),NULL)]]> ... |
| 7192 | Parallel Job | ATL201File Reciept | DB_Select_ SIL_CTRL_ Batch_Exec | Database HardCoding | DWH_D | <?xml version='1.0' encoding="UTF-16'?> <Properties version='1.1' .... <![CDATA[insert into SIL.SIL_CTRL_Batch_Exec(Batch_ID, Business_Date,Job_Start_Date_Time,Job_ End_Date_Time,User_Name,Job_ID,Serial_ No) values (0,CONVERT (date, GETDATE()), {fn NOW()},{fn NOW()},'sol2dev',(select Job_ID from SIL.SIL_CTRL_Job_Defn where Job_Name ='ATL201FileReciept'),NULL)]]> ... |
| ... | | | | | | |

| DSX Line No. | Object Type | Object Name | Stage Name | Stage Type | Violation Type | Violation Description |
|---|---|---|---|---|---|---|
| -1 | Parallel Job | AIE001WriteSAPFile | N/A | N/A | Annotation | No Job Annotation |
| -1 | Parallel Job | AIE001WriteSAPFile | XFM_Journal_ID | Transformer | Naming | Stage variable name <Counter> not as per standard - ^sv.*$ |
| ... | | | | | | |
| 63836 | Parallel Job | AIS001DataValidation | DB_Upd_AIS_ Journal_Incoming | ODBC_Connector | Record Count | Commit Count (Record Count) should not be less than 3000 [current value : 2000 ] |
| 63836 | Parallel Job | AIS001DataValidation | DB_Upd_AIS_ Journal_Incoming | ODBC_Connector | Array Size | Array Size should not be less than 3000 [current value : 2000 ] |
| ... | | | | | | |
| 1976279 | Routine [Function] | srDailyMeasures Reconcilation | N/A | N/A | SELECT[]+ COUNT[]*\ ([]*[]*) | Select Statement Ineffective [Select count(*)] |
| ... | | | | | | |
| -1 | Sequence Job | ATLGEN002 TerminateMaster Script | N/A | N/A | Parameter | Parameter <$APT_GRID_COMPUTENODES> should be present |
| ... | | | | | | |
| -1 | Shared Container | pscErrorHandling | Container.boError Handling | Others | Auto Partitioning | Auto Partitioning on Link <lkStop> |
| ... | | | | | | |

VALIDATING CODE OF AN EXTRACT, TRANSFORM AND LOAD (ETL) TOOL

TECHNICAL FIELD

The present invention relates to reviewing ETL code, and more particularly to validating ETL code to accelerate review of ETL projects.

BACKGROUND

ETL projects involve complex logic and a large number of jobs and other objects. For example, each project may include 100 to 1000 jobs and other objects. Effective and quality delivery demands disciplined coding. Software developers drawing from different experiences may generate undisciplined coding of low quality. Low quality code has defects and experiences malfunctions, which leads to increased cost and time requirements to rework the code to fix the defects. In the long run, low quality code leads to a lower client confidence in the developers' ability to deliver quality code, which impacts the reputation of the developers. For any project, code quality standards are set before development activities start. The standards specify how to name objects, the best coding practices to be followed, etc. Low quality code still results when developers do not comply with the standards. Not complying with the standards may result from various reasons, including the lack of experience of a developer, the developer being unaware of the relevance of a particular standard and its impact, and/or overlooking a standard by mistake. Overlooking a standard is the most common source of non-compliance with the standards because it is easy for a developer to miss one of the hundreds of standards that may be set for a particular project. Known techniques for addressing non-compliance with the standards are reviews (e.g., peer reviews, group reviews, etc.). Reviews in ETL projects are mostly manual processes. Manual reviews of hundreds of standards are time consuming processes and can be difficult to execute in ETL projects with aggressive timelines. Even if manual reviews are done, reviewers can make mistakes similar to the developers by overlooking some of the standards. With only manual reviews in place, it is difficult to assure a 100% adherence to standards and the quality of deliverables is always at risk.

BRIEF SUMMARY

In a first embodiment, the present invention provides a method of validating code for an extract, transform and load (ETL) tool. The method includes responsive to a receipt of naming, coding, and performance standards for the code of the ETL tool and an export of the code to a job definition file, a computer parsing the code of the ETL tool in the job definition file. The method further includes the computer determining violations of the naming, coding, and performance standards in part by determining the parsed code does not match the naming, coding, and performance standards. The method further includes the computer generating a report which identifies the violations. The method further includes, based at least in part on a review of the report and a rework of the code to comply with the naming, coding and performance standards and responsive to an export of the reworked code to another job definition file, the computer parsing the reworked code in the other job definition file, determining that the parsed reworked code does not include the violations of the naming, coding and performance standards, and generating a second report that indicates that the reworked code does not include the violations.

In a second embodiment, the present invention provides a computer system including a central processing unit (CPU); a memory coupled to the CPU; and a computer-readable storage device coupled to the CPU. The storage device includes instructions that are executed by the CPU via the memory to implement a method of validating code for an extract, transform and load (ETL) tool. The method includes responsive to a receipt of naming, coding, and performance standards for the code of the ETL tool and an export of the code to a job definition file, the computer system parsing the code of the ETL tool in the job definition file. The method further includes the computer system determining violations of the naming, coding, and performance standards in part by determining the parsed code does not match the naming, coding, and performance standards. The method further includes the computer system generating a report which identifies the violations. The method further includes, based at least in part on a review of the report and a rework of the code to comply with the naming, coding and performance standards and responsive to an export of the reworked code to another job definition file, the computer system parsing the reworked code in the other job definition file, determining that the parsed reworked code does not include the violations of the naming, coding and performance standards, and generating a second report that indicates that the reworked code does not include the violations.

In a third embodiment, the present invention provides a computer program product including a computer-readable storage device and a computer-readable program code stored in the computer-readable storage device. The computer-readable program code includes instructions that are executed by a central processing unit (CPU) of a computer system to implement a method of validating code for an extract, transform and load (ETL) tool. The method includes responsive to a receipt of naming, coding, and performance standards for the code of the ETL tool and an export of the code to a job definition file, the computer system parsing the code of the ETL tool in the job definition file. The method includes the computer system determining violations of the naming, coding, and performance standards in part by determining the parsed code does not match the naming, coding, and performance standards. The method further includes the computer system generating a report which identifies the violations. The method further includes, based at least in part on a review of the report and a rework of the code to comply with the naming, coding and performance standards and responsive to an export of the reworked code to another job definition file, the computer system parsing the reworked code in the other job definition file, determining that the parsed reworked code does not include the violations of the naming, coding and performance standards, and generating a second report that indicates that the reworked code does not include the violations.

Embodiments of the present invention provide a tool named "Validation Script" that automatically validates ETL code based on naming, coding, and performance standards and reports violations of the standards, which facilitates effective review of the code in less time. The Validation Script tool described herein facilitates the generation of high quality, disciplined coding for an ETL tool, and traps most code issues before code is delivered from the development environment, thereby decreasing costs involved in reworking code to fix code defects. The reporting of violations includes indicators (e.g., red highlights of standards violations) that allow even non-technical managers to easily monitor the quality of code of an ETL tool. The report also lists configuration details of different objects in a categorized and formatted manner, making the reports detailed and exhaustive. The reports generated will even allow technical experts (who do not have access to the code) to complete a detailed review of the code. Embodiments of the present invention provide processes for an automatic review and a partially manual review of ETL code. The automatic review can provide a 100% savings on review efforts and the partially manual review can provide at least a 50-60% savings on review efforts.

DETAILED DESCRIPTION

Overview

Embodiments of the present invention provide automated validation of code in an ETL tool, where the validation is based on determinations of whether the code adheres to predetermined naming, coding and performance standards. The tool "Validation Script" is employed by ETL projects as a review accelerator to determine whether objects developed for the ETL projects adhere to standards and to generate a well-formatted report that indicates which objects adhere to the standards and which objects violate the standards. In one embodiment, the ETL tool that works with Validation Script is IBM® DataStage®, which is an ETL tool offered by International Business Machines Corporation located in Armonk, N.Y. IBM and DataStage are United States registered trademarks of International Business Machines Corporation. Embodiments of the present invention also include a unique "Release Process" with the method described herein, giving a highly robust quality checkpoint for any ETL project.

System for Validating Code of an ETL Tool

Figure 1:
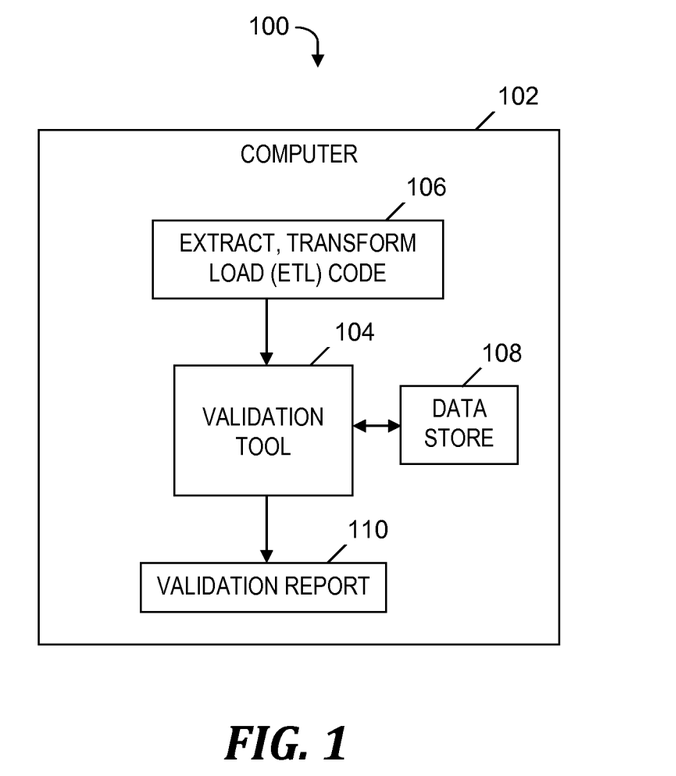
FIG. 1 is a block diagram of a system for validating code of an ETL tool, in accordance with embodiments of the present invention.

FIG. 1 is a block diagram of a system 100 for validating code of an ETL tool, in accordance with embodiments of the present invention. System 100 includes a computer 102, which executes a software-based validation tool 104 (i.e., Validation Script), which is employed by projects using a software-based ETL tool (not shown) that is executed by computer 102. In one embodiment, validation tool 104 is employed by ETL projects using the DataStage ETL tool.

Validation tool 104 receives ETL code 106 in a job definition file which specifies code and attributes of code that includes jobs and other objects of an ETL project. In one embodiment, the job definition file is a flat file in DataStage® Export (DSX) format. Validation tool 104 retrieves naming, coding, and performance standards which are stored in a data store 108 and determines whether ETL code 106 complies with the standards.

The naming standards stored in data store 108 identify valid names in an ETL project, including valid names for jobs, sequences and other objects, parameters and parameter sets, stage variables, and links in jobs and sequences. The performance standards stored in data store 108 enforce (1) limits on usage of expensive stages, including aggregators, sort stages, and transformers; (2) limits on expensive operations, including inline sorting, repartitioning, database read/write operations, and file read/write operations; (3) effectiveness of the performance of queries, including prohibiting select * or select count(*) and enforcing efficient array size and commit count. Annotations standards stored in data store 108 require jobs and sequences to be well annotated. Partitioning-related standards stored in data store 108 prohibit usage of auto partitioning. Parameter constraints configured in validation tool 104 enforce certain parameters to be present or not present on jobs, and enforce standards on the default values specified for parameters. Job activity parameter constraints configured in validation tool 104 enforce standards on values passed to jobs from a sequence job. Other standards stored in data store 108 require: (1) file paths begin with a root path defined at the project level, and (2) surrogate keys are generated in Surrogate Key Generator (SKG) stages and not in Transformer stages.

Figure 3:
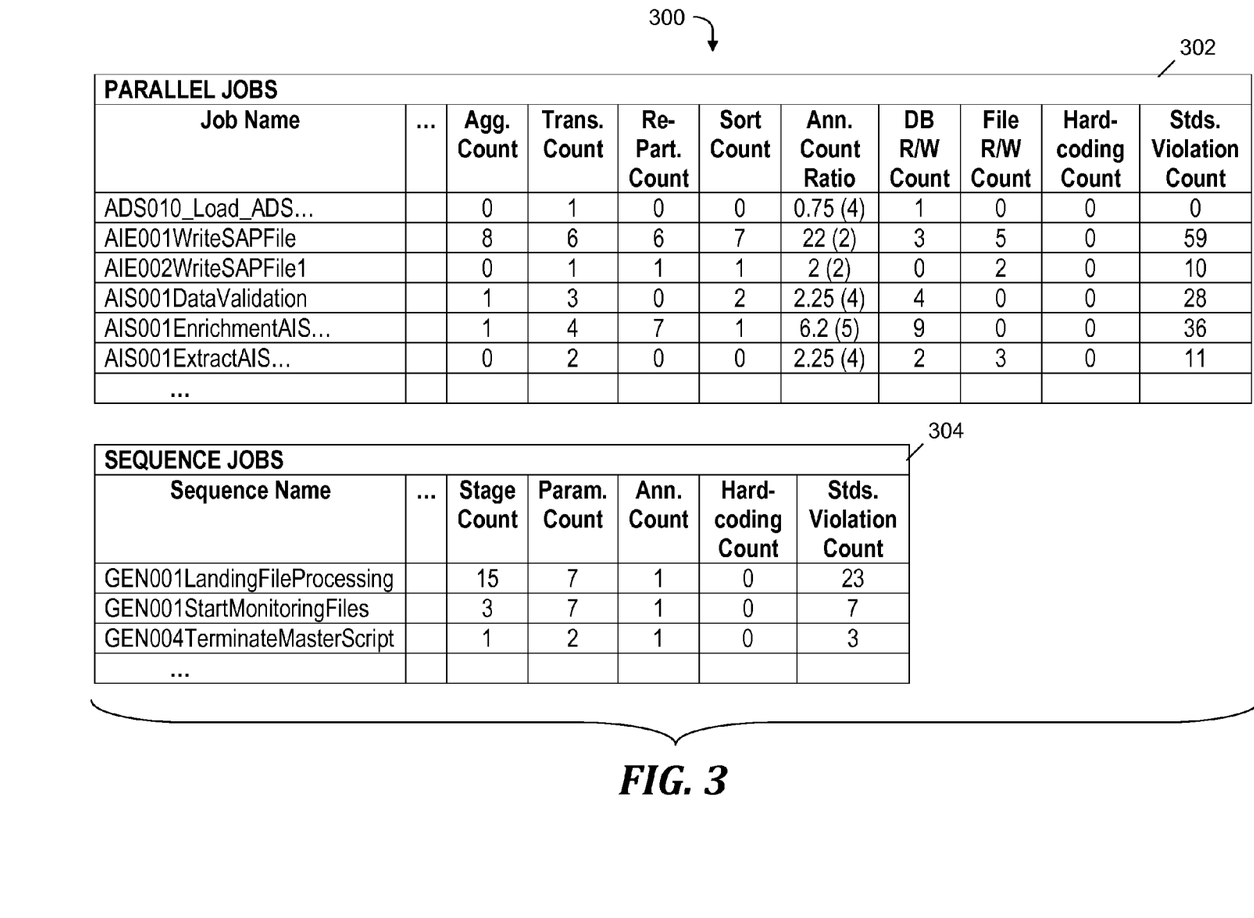
FIG. 3 depicts an exemplary portion of a report summarizing violations of standards determined by the process of FIG. 2, where the report is generated by the system of FIG. 1, in accordance with embodiments of the present invention.
Figure 4:
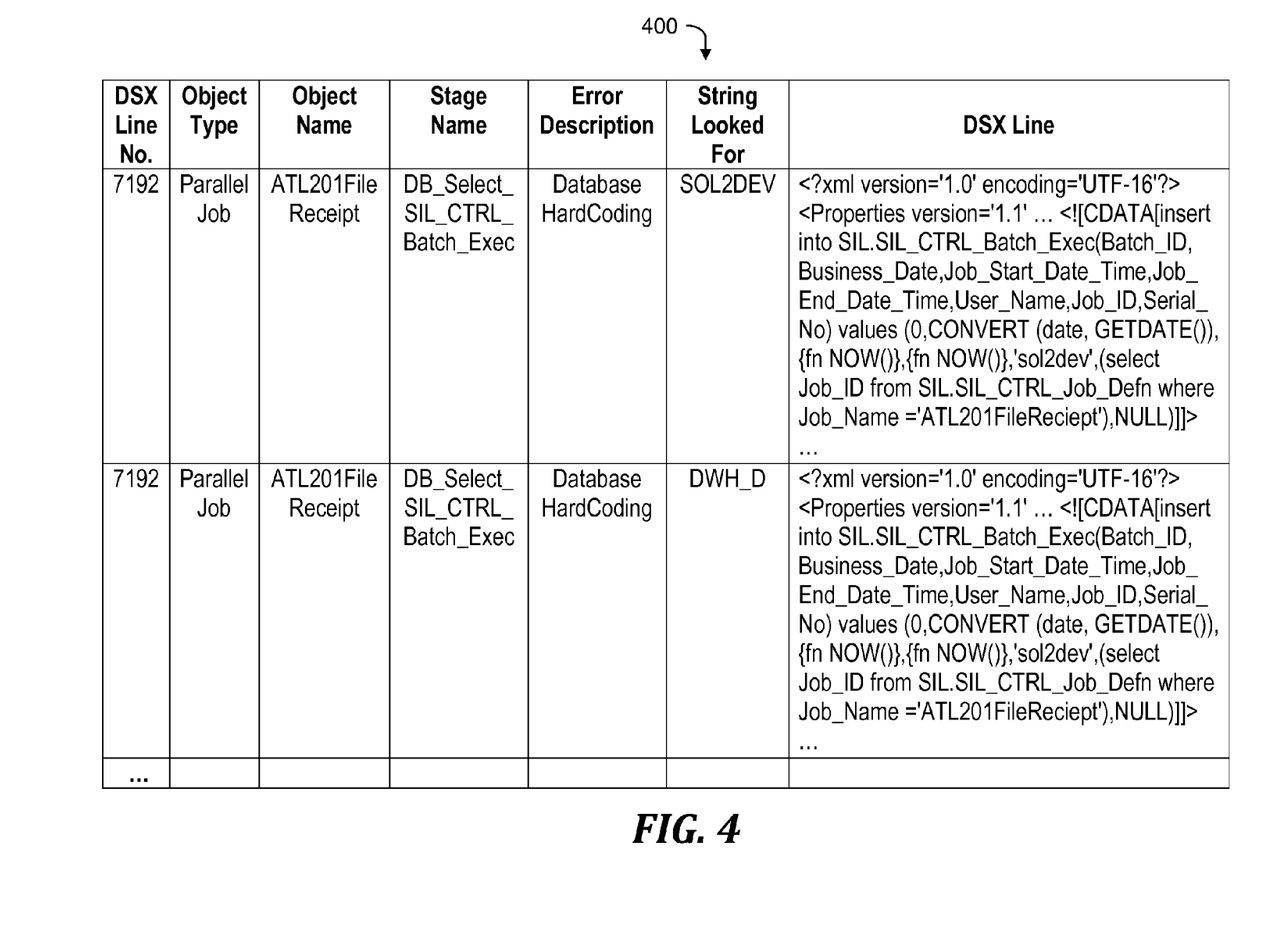
FIG. 4 is an exemplary portion of a report indicating hardcoding violations determined by the process of FIG. 2, where the report is generated by the system of FIG. 1, in accordance with embodiments of the present invention.
Figure 5:
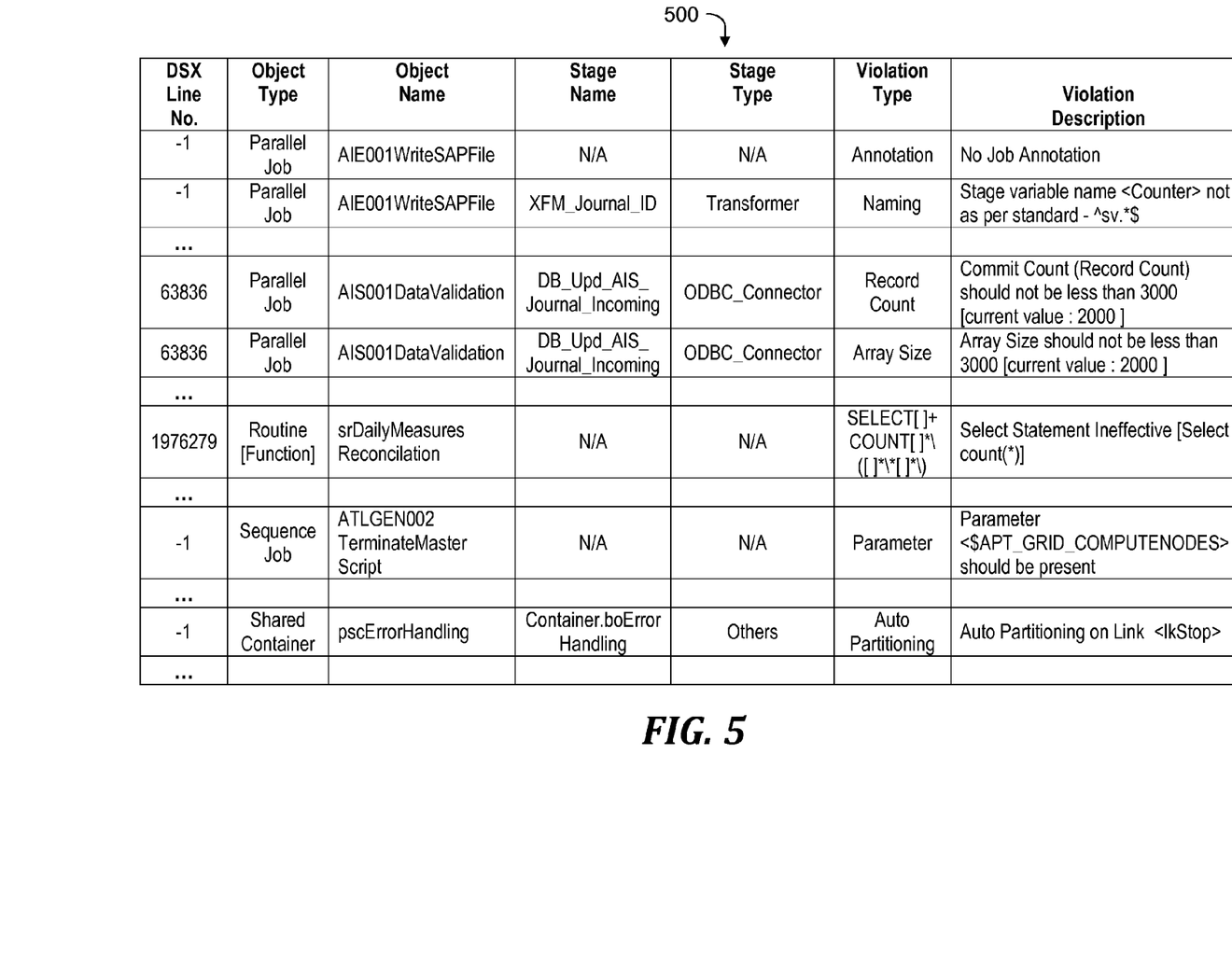
FIG. 5 is an exemplary portion of a report indicating standards violations determined by the process of FIG. 2, where the report is generated by the system of FIG. 1, in accordance with embodiments of the present invention.

Validation tool 104 generates a validation report 110, which includes at least: (1) a summary of a validation of each the jobs and other objects specified by ETL code 106, (2) hardcoding present in the jobs and other objects specified by ETL code 106, and (3) standards violations present in the jobs and other objects specified by ETL code 106. Examples of portions of validation report 110 that include the summary of the validation, the hardcoding, and the standards violations are depicted in FIG. 3, FIG. 4 and FIG. 5, respectively.

The aforementioned summary of the validation includes a list of jobs and other objects specified by ETL code 106. The list of jobs and other objects may be grouped into categories, such as parallel jobs, shared containers, sequence jobs, routines, custom stages, parameter sets, table definitions, etc. The summary includes object-specific information for each job or other object. The object-specific information includes counts of violations for each object, including a count of the number of instances of hardcoding in an object and a count of the number of standards violations included in the object. In one embodiment, the object-specific information includes one or more of: a count of stages, a count of parameters, a count of aggregators, a count of transformers, a count of re-partitioning methods, a count of sorts, a count of annotations, a count of database read/write operations, and a count of file read/write operations.

For example, for each parallel job, the object-specific information includes: (1) date the object was modified, (2) time the object was modified, (3) whether multiple invocations of the same job can be run simultaneously, (4) whether runtime column propagation (RCP) is enabled, (5) whether an after job subroutine is present, (6) whether a before job subroutine is present, (7) stage count, (8) parameter count, (9) aggregator count, (10) transformer count, (11) re-partitioning count, (12) sort count, (13) annotation count, (14) database read/write count, (15) file read/write count, (16) hardcoding count, (17) standards violation count, and (18) job folder of the job.

Validation tool 104 determines whether the count of an item specified by the object-specific information exceeds a predetermined threshold value stored in data store 108. If the count exceeds the threshold value, validation report 110 includes a red colored background or other indicator for the count to indicate a violation of standards stored in data store 108. Furthermore, if validation tool 104 determines that any count of an item of an object exceeds the corresponding threshold value, then validation report 110 includes a red colored background or other indicator for the name of the object. If validation tool 104 determines that the counts of all items for an object do not exceed the corresponding threshold values, then validation report 110 depicts the object without red colored background and any other indicator of a violation to indicate that the object adheres to all naming, coding, and performance standards stored in data store 108. A reviewer studies validation report 110 to find which objects have and which objects do not have a red colored background or other indication of a standard violation. In this way, the report gives a complete picture on the quality of the code being delivered.

For example, if validation tool 104 receives a threshold value of zero for standards violations and determines that the number of standards violations for object XYZ is four, then validation report 110 includes the standards violation count of four with a red background to indicate that four exceeds the threshold value of zero, and includes the name "XYZ" with a red background to indicate that there is at least one violation associated with object XYZ. As another example, if validation tool 104 receives a threshold value of one for the transformer count and subsequently determines that object XYZ includes two transformers, then validation tool 104 generates validation report 110 to include the count of two transformers with a red background to indicate that transformer count of two exceeds the threshold value of one.

The aforementioned hardcoding portion of validation report 110 includes a list of all hardcoding present in the ETL code 106, which includes a line number in the job definition file (e.g., DSX line number), object type, object name, stage name, error description, the string validation tool 104 searched for in ETL code 106 to determine hardcoding is present, and the line in the job definition file (e.g., DSX line).

The aforementioned standards violation portion of validation report 110 includes a list of all violations of the standards stored in data store 108, which includes object name, object type, stage name, stage type, and type and description of the violation. For a violation of a naming standard, the list of violations includes the current, non-compliant name of the object along with the expected name of the object which complies with the naming standard.

Validation report 110 may also include one or more of: (1) a list of parameters, defined on jobs and routines specified by ETL code 106, (2) files used in parallel jobs specified by ETL code 106, (3) queries in all the parallel jobs specified by ETL code 106, (4) job activities in every sequence specified by ETL code 106, (5) a list of after and before subroutines of every parallel job specified by ETL code 106, (6) a list of details of email activities for every sequence specified by ETL code 106, (7) a list of expressions from transformers where direct mapping is not present, and (8) job change history. The list of these sheets will grow in next versions of the tool making review easier and complete.

In one embodiment, validation tool 104 (see FIG. 1) is implemented as a multi-worksheet workbook of a spreadsheet application program, such as Microsoft® Excel® offered by Microsoft Corporation located in Redmond, Wash. Microsoft and Excel are registered trademarks of Microsoft Corporation in the United States and other countries.

The functionality of the components of FIG. 1 is described in more detail in the discussions presented below relative to FIG. 2 and FIG. 6.

Process for Validating Code of an ETL Tool

Figure 2:
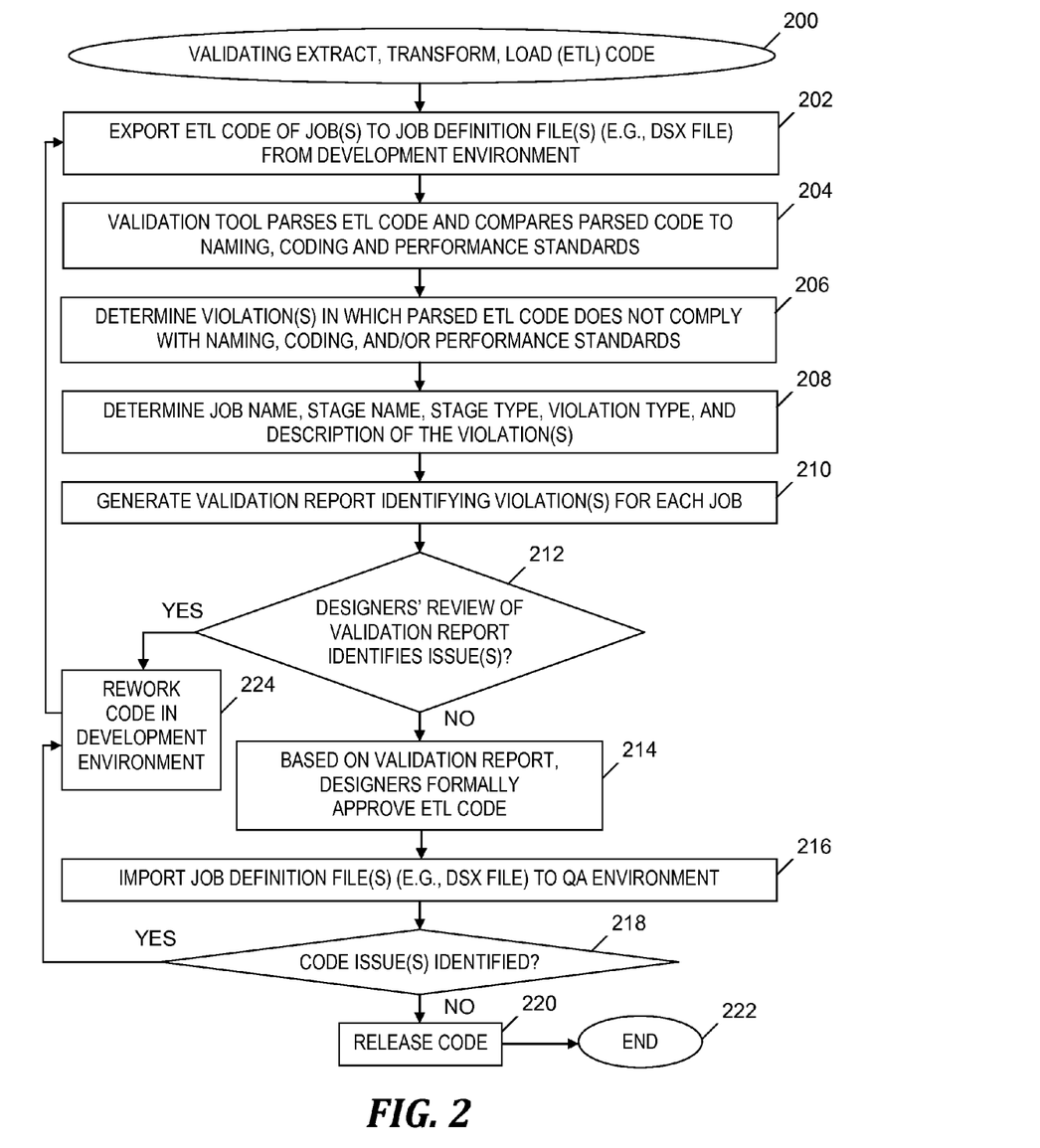
FIG. 2 is a flowchart of a process of validating code of an ETL tool, where the process is implemented in the system of FIG. 1, in accordance with embodiments of the present invention.

FIG. 2 is a flowchart of a process of validating code 106 (see FIG. 1) of an ETL tool, where the process is implemented in the system of FIG. 1, in accordance with embodiments of the present invention. The process of FIG. 2 starts at step 200. Prior to step 202, computer 102 (see FIG. 1) receives naming, coding, and performance standards for ETL code 106 (see FIG. 1) and stores the received standards in data store 108 (see FIG. 1). The received ETL code 106 specifies job(s) and/or other object(s) of ETL project(s). Hereinafter, in the discussion of FIG. 2, the received naming, coding, and performance standards are collectively referred to as "the standards."

In step 202, computer 102 (see FIG. 1) or another computer (not shown) exports ETL code 106 (see FIG. 1) to job definition file(s) (e.g., DSX file(s)). Validation tool 104 (see FIG. 1) receives the exported ETL code 106 (see FIG. 1) prior to step 204.

In step 204, validation tool 104 (see FIG. 1) parses the ETL code 106 (see FIG. 1) and compares the parsed code 106 (see FIG. 1) to the standards to determine whether portion(s) of the ETL code 106 (see FIG. 1) (1) match character strings or regular expressions specified by the standards, (2) indicate the usage of expensive stages and operations in ETL code 106 (see FIG. 1) does not exceed predetermined threshold values specified by the standards, (3) indicate effective performance of queries in ETL code 106 (see FIG. 1), and (4) indicate usage of auto partitioning in ETL code 106 (see FIG. 1). In one embodiment, in step 204, validation tool 104 (see FIG. 1) parses a DSX file into which objects of an ETL project specified by the ETL code 106 (see FIG. 1) was exported.

The aforementioned match of character strings includes (1) beginning characters of a name of an object matching a predetermined string of characters or a regular expression to indicate a violation of a naming standard, and (2) any portion of ETL code 106 (see FIG. 1) matching a predetermined string of characters (e.g., matching the string "DWH_D") or a regular expression to indicate an instance of hardcoding. For example, determining that a dataset name does not start with "DS_" indicates a naming standard violation and determining that a portion of ETL code 106 (see FIG. 1) matches "DWH_D" indicates an instance of hardcoding.

The aforementioned predetermined threshold values indicate limits on attributes of ETL code 106, where the attributes are associated with the expensive stages and operations. For example, a predetermined threshold value of 1 for an aggregator count means that determining that a job has more than one aggregator indicates a performance standard violation for the job.

The comparison to the standards to determine whether portion(s) of ETL code 106 (see FIG. 1) indicate usage of auto partitioning determines a standards violation if validation tool 104 (see FIG. 1) determines that ETL code 106 (see FIG. 1) specifies an automatic selection of a partitioning method for a link in ETL code 106 (see FIG. 1).

The comparison of the parsed code 106 (see FIG. 1) to the standards also determine whether (1) file paths in ETL code 106 (see FIG. 1) begin with a root path defined at the project level, (2) surrogate keys in ETL code 106 (see FIG. 1) are generated only in SKG stages, (3) parameter(s) in a first predetermined set of parameter(s) are present in a job specified by ETL code 106 (see FIG. 1), (4) parameter(s) in a second predetermined set of parameter(s) are not present in a job specified by ETL code 106 (see FIG. 1), and (6) a job specified by ETL code 106 (see FIG. 1) is annotated in a field that describes the job.

In step 206, validation tool 104 (see FIG. 1) determines violation(s) in which job(s) and/or other object(s) of the parsed ETL code 106 (see FIG. 1) do not comply with the standards based in part on the comparison in step 204 determining that portion(s) of ETL code 106 (see FIG. 1) (1) do not match character strings or regular expressions specified by the standards, (2) indicate the usage of expensive stages and operations in ETL code 106 (see FIG. 1) exceeds the predetermined threshold values specified by the standards, (3) indicate ineffective performance of the queries in ETL code 106 (see FIG. 1), and/or (4) indicate ineffective usage of partitioning in ETL code 106 (see FIG. 1).

In one embodiment, the violation(s) determined in step 206 are also based in part on validation tool 104 (see FIG. 1) determining (1) a file path in ETL code 106 (see FIG. 1) does not begin with a root path defined at the project level, (2) a surrogate key in ETL code 106 (see FIG. 1) is generated in a transformer stage or another stage other than an SKG stage, (3) parameter(s) in the first predetermined set of parameter(s) are present in a job specified by ETL code 106 (see FIG. 1), (4) parameter(s) in the second predetermined set of parameter(s) are not present in the job, (5) the job is not annotated in a field that describes the job, (6) the field that describes the job does not include a value specified by a job annotation standard, (7) the field that describes the job does not include a name of the job, (8) a job activity in a sequence specified by ETL code 106 (see FIG. 1) does not pass a value specified by a job activity parameter standard, (9) an add checkpoints feature is not enabled for the sequence, where the add checkpoints feature allows jobs in the sequence to be restartable after a failure of the jobs, (10) a handle activities that fail feature is not enabled for the sequence, where the handle activities that fail feature allows an activity of a failing job in the sequence to be handled by triggering automatically inserted code that branches to an error handling point, (11) a log job errors feature is not enabled for the sequence, where the log job errors feature allows a message to be logged about a job whose run ends with a warning or fatal error, (12) a log job reports feature is not enabled for the sequence, where the log job reports feature allows a status report to be logged after a run of the job, and/or (13) a reset if required then run feature is not enabled for the sequence, where the reset if required then run feature allows the job to be run each time the sequence is run, even after a run of the sequence is aborted.

In one embodiment, the violation(s) determined in step 206 are also based in part on validation tool 104 (see FIG. 1) determining that (1) a count of the number of aggregator stages of a job specified by ETL code 106 (see FIG. 1) exceeds a predetermined maximum number of aggregator stages, (2) a count of the number of transformer stages of the job exceeds a predetermined maximum number of transformer stages, (3) a count of the number of occurrences of re-partitioning of data sets in the job exceeds a predetermined maximum number of occurrences of re-partitioning of data sets, (4) a count of the number of sort stages in the job exceeds a predetermined maximum number of sort stages, (5) a count of the number of database read/write operations in the job exceeds a predetermined maximum number of database read/write operations, (6) a count of a number of sequential file read/write operations in the job exceeds a predetermined maximum number of sequential file read/write operations, (7) a ratio of a number of stages of the job to a number of stages of the job that are annotated is less than a predetermined minimum ratio of the number of stages to the number of stages that are annotated, (8) a size of a transaction for an insert, update, or delete operation of the job is less than a predetermined minimum size of the transaction, and/or (9) a size of an array employed for the insert, update, or delete operation of the job is less than a predetermined minimum size of the array. Validation tool 104 (see FIG. 1) receives the predetermined maximums and minimums described in this paragraph in items (1)-(9) prior to step 206.

In step 208, for each violation determined in step 206, validation tool 104 (see FIG. 1) determines attributes of the violation, including a corresponding job or object name, stage name, stage type, violation type and description of the violation.

In step 210, validation tool 104 (see FIG. 1) generates validation report 110 (see FIG. 1), which identifies one or both of the following items: (1) object(s) of ETL code 106 (see FIG. 1) that violate the standards and (2) other object(s) of ETL code 106 (see FIG. 1) that comply with the standards. The violation(s) of the standards included in validation report 110 (see FIG. 1) are determined in step 206. Subsequent to generating validation report 110 (see FIG. 1), validation tool 104 (see FIG. 1) sends validation report 110 (see FIG. 1) to designer(s) for their review. In one embodiment, validation report 110 (see FIG. 1) is in a spreadsheet format.

In step 212, designer(s) determine whether their review of the validation report 110 (see FIG. 1) identifies issue(s) in the ETL code 106 (see FIG. 1) that need to be corrected or otherwise addressed. Identifying issue(s) in the ETL code 106 (see FIG. 1) in the review includes determining whether validation report 110 (see FIG. 1) includes a red colored background (or another predetermined visual indicator of a violation of a standard) for the name(s) of object(s) listed in validation report 110 (see FIG. 1) and/or for attribute(s) of each of the object(s) which are listed in validation report 110 (see FIG. 1). An attribute of an object that has the red colored background or other predetermined visual indicator indicates that the attribute causes the comparison in step 204 to determine a violation of the standards. In one embodiment, the review also includes the partially manual and partially automated review described in the section presented below entitled "Partially Manual Review." For example, reviewers go through a "Queries" sheet in validation report 110 (see FIG. 1) to find all the queries used in the ETL code and to check to see if all the queries have the right clauses.

If none of the objects in validation report 110 (see FIG. 1) includes the red colored background or other predetermined visual indicator of a standards violation, then ETL code 106 (see FIG. 1) does not have any issue(s) that require correction. If the designer(s)' review identifies no issue(s) with the ETL code 106 (see FIG. 1) by determining that no objects listed in validation report 110 (see FIG. 1) have any attribute with the red colored background or other visual indicator of a standards violation, then the No branch of step 212 is taken and step 214 is performed.

In an alternate embodiment, if none of the objects in validation report 110 (see FIG. 1) includes the visual indicator of a standards violation and if the partially manual review does not find any issues with the additional information in validation report 110 (see FIG. 1), as described below in the Partially Manual Review section, then ETL code 106 (see FIG. 1) does not have any issues that require correction, the No branch of step 212 is taken and step 214 is performed.

In step 214, based on validation report 110 (see FIG. 1) not having any indicator of standard violations as determined by the designer(s)' review, the designer(s) formally approve the ETL code 106 (see FIG. 1). Subsequent to step 214 and prior to step 216, validation tool 104 (see FIG. 1) receives an indication of the approval of the ETL code 106 (see FIG. 1).

In an alternative embodiment, in step 214, based on validation report 110 (see FIG. 1) not having any indicator of standard violations as determined by the designer(s)' review and the partially manual review not finding any issues with the additional information in validation report 110 (see FIG. 1), as described below in the Partially Manual Review section, the designer(s) formally approve the ETL code 106 (see FIG. 1).

In step 216, job definition file(s) (e.g., file in DSX format) specifying the ETL code 106 (see FIG. 1) is imported to computer 102 (see FIG. 1) or another computer (not shown) in a Quality Assurance (QA) environment.

Prior to step 218, computer 102 (see FIG. 1) or another computer (not shown) attempts to run the ETL code 106 (see FIG. 1) end-to-end and the results are reviewed by experts in the QA environment. In step 218, if the review in the QA environment identifies no issue(s) with the ETL code 106 (see FIG. 1) by a review of the results of the end-to-end run, then the No branch of step 218 is taken and step 220 is performed.

In step 220, computer 102 (see FIG. 1) generates release notes associated with the ETL code 106 (see FIG. 1) and releases the ETL code 106 (see FIG. 1) and the release notes. Following step 220, the process of FIG. 2 ends at step 222.

Returning to step 218, if the review in the QA environment identifies issue(s) with the ETL code 106 (see FIG. 1) that need to be corrected or otherwise addressed, then the Yes branch of step 218 is taken and step 224 is performed. In step 224, the designer(s) rework the ETL code 106 (see FIG. 1) in the development environment to correct the issue(s) and the process loops back to step 202 to export the reworked ETL code 106 (see FIG. 1) to job definition file(s). In the subsequent iteration of steps 202, 204, 206, 208, 210, 212, and 214, the ETL code 106 (see FIG. 1) is replaced with the reworked ETL code 106 (see FIG. 1) resulting from the most recent performance of step 224.

Returning to step 212, if the designer(s)' review identifies issue(s) with the ETL code 106 (see FIG. 1) that need to be corrected or otherwise addressed, then the Yes branch of step 212 is taken and step 224 is performed. In step 224 following the Yes branch of step 212, the designer(s) rework the ETL code 106 (see FIG. 1) in the development environment to correct the identified issue(s) and the process loops back to step 202 to export the reworked ETL code 106 (see FIG. 1) to job definition file(s). In the subsequent iteration of steps 202, 204, 206, 208, 210, and 212 (and step 214 if the No branch of step 212 is taken in the subsequent iteration), the ETL code 106 (see FIG. 1) is replaced with the reworked ETL code 106 (see FIG. 1) resulting from the most recent performance of step 224.

In an alternate embodiment, returning to step 212, if (1) the designer(s)' review identifies issue(s) with the ETL code 106 (see FIG. 1) based on standard violation indicators in validation report 110 (see FIG. 1), or if the partially manual review finds issue(s) with the additional information in validation report 110 (see FIG. 1), as described below in the Partially Manual Review section, then the Yes branch of step 212 is taken and step 224 is performed. In step 224 following the Yes branch of step 212, the designer(s) rework the ETL code 106 (see FIG. 1) in the development environment to correct the identified issue(s) and the process loops back to step 202 to export the reworked ETL code 106 (see FIG. 1) to job definition file(s). In the subsequent iteration of steps 202, 204, 206, 208, 210, and 212 (and step 214 if the No branch of step 212 is taken in the subsequent iteration), the ETL code 106 (see FIG. 1) is replaced with the reworked ETL code 106 (see FIG. 1) resulting from the most recent performance of step 224.

Partially Manual Review

In one embodiment, the review in step 212 (see FIG. 2) includes a partially manual review that uses additional information included in validation report 110 (see FIG. 1). The partially manual review checks (1) parameters from all objects (i.e., all jobs, sequences and routines) specified by ETL code 106 (see FIG. 1), (2) file names referred to in different jobs from all kinds of file stages, (3) queries from all database stages, (4) parameters passed to job activities in different sequences, (5) job subroutines, (6) format of emails from all mail activities, including the body of the email and attachment(s) to the email, (7) all expressions from transformers including stage variables, output links, and loop variables, and (8) job full description along with the last modified timestamp of the job, which helps to verify job history. The aforementioned checks (1)-(8) are described below.

In the check of the parameters from all objects specified by ETL code 106, a reviewer views a list of parameters defined on jobs, sequences and routines, along with the type of parameter and the default value set, to (1) verify consistency in naming of similar parameters across ETL projects, (2) identify redundant parameters, (3) verify type of parameters and default values, and (4) verify parameters defined on routines.

In the check of the file names referred to in different jobs from all kinds of file stages, a reviewer views a list of all the different files used in parallel jobs specified by ETL code 106 (see FIG. 1), along with a type of the file (i.e., sequential, dataset, file set, lookup file set, or surrogate key state file), whether each instance is a read or write operation, and whether each instance is a SKG state file, to (1) check if all the files read are written somewhere in the system, (2) identify typographical errors in file names, and (3) during debugging, identify where a file is written or read instead of traversing through sequences.

In the check of queries from all database stages, a reviewer views a list of queries from all the parallel jobs specified by ETL code 106 (see FIG. 1), along with query types (e.g., before query or after query), write mode (e.g., insert, update, or read), and table action (e.g., append or truncate), to (1) verify that each query has proper clauses and structure, (2) check if queries are performance effective, (3) check if the write mode is "append," "truncate," etc. at appropriate places, and (4) check if update queries have only primary keys in the "where" clause.

In the check of parameters passed to job activities in different sequences, a reviewer views a list of all job activities in every sequence specified by ETL code 106 (see FIG. 1), along with corresponding job names, all parameters of every job activity listed separately together with the values passed, and flags indicating whether the values are directly passed from the sequence parameters to (1) check if appropriate values are passed for parameters in each job activity, (2) validate the values passed when the flag is "false" (i.e., value is not directly passed from the parameter) to facilitate detection of any hardcoded values that are passed to the job, and (3) determine which sequence(s) are invoking a particular job.

In the check of job subroutines, a reviewer views a list of after subroutines and before subroutines for every parallel job specified by ETL code 106 (see FIG. 1) to check if the correct subroutines are invoked in each job and to facilitate a review of routines of a significant number (e.g., hundreds) of jobs.

In the check of the format of emails from all mail activities, a reviewer views the subject, sender address, recipient list, attachments, and body of each mail activity to (1) check for proper structure of the message in the email body, (2) check for accuracy of the subject, (3) check whether attachments are present in cases where attachments are expected and whether the attachments refer to the appropriate files, (4) check whether the sender and recipient list are as expected, and (5) check that only mails that indicate an aborted job have a job report indicated.

In the check of all expressions from transformers including stage variables, output links, and loop variables, a reviewer views expressions from transformers whenever a direct mapping is not present, along with expressions of links, stage variables and loop variables to (1) check the accuracy of the expressions, (2) check for performance effectiveness of the expressions, and (3) verifying that the correct parameters are passed when parallel routines are being invoked.

In the check of job full description, a reviewer views a list of the job full descriptions of every job along with the timestamp of the last modification of the job to (1) verify that job change history is present, (2) use the date modified to verify that a history log is present for the latest change, and (3) check whether the change description is accurate, meaningful, and properly structured.

EXAMPLES

FIG. 3 depicts an exemplary portion 300 of validation report 110 (see FIG. 1) summarizing violations of standards determined by the process of FIG. 2, where the report is generated by the system of FIG. 1, in accordance with embodiments of the present invention. Portion 300 includes a section 302 including a list of parallel jobs and a section 304 including a list of sequence jobs, which are determined by validation tool 104 (see FIG. 1).

Section 302 includes object-specific information for each job, including a job name, aggregator count, transformer count, re-partitioning count, sort count, annotation count, database read/write count, file read/write count, hardcoding count (i.e., count of the number of instances of hardcoding for each job), and standards violation count.

For example, for the second row of data in section 302, the job name is AIE001WriteSAPFile, the aggregator count is 8, the transformer count is 6, the re-partitioning count is 6, the sort count is 7, the annotation count ratio is 22, the database read/write count is 3, the file read/write count is 5, the hardcoding count is 0, and the standards violation count is 59.

Although not shown in FIG. 3, an indicator of a red colored background is present for the items that exceed corresponding threshold values. For example, in the second row of data in section 302, the aggregator count, transformer count, re-partitioning count, sort count, annotation count ratio, and standards violation count exceed predetermined thresholds of 1, 1, 1, 1, 2, and 0, respectively. Therefore, each of the aggregator count, transformer count, re-partitioning count, sort count, annotation count ratio, and standards violation count has a red colored background to indicate a standards violation. Furthermore, the job name of AIE001WriteSAPFile has a red colored background to indicate the job has at least one standards violation and/or at least one hardcoding violation.

FIG. 4 is an exemplary portion 400 of validation report 110 (see FIG. 1) indicating hardcoding violations determined by the process of FIG. 2, where the report is generated by the system of FIG. 1, in accordance with embodiments of the present invention. Portion 400 includes a list of hardcoding violations determined by validation tool 104 (see FIG. 1), where each hardcoding violation is identified by DSX line number, object type, object name, stage name, error description, string looked for, and DSX line.

For example, the first row of data in portion 400 indicates that for a parallel job having the name ATL201FileReceipt, validation tool 104 (see FIG. 1) detects a database hardcoding violation because validation tool 104 (see FIG. 1) finds the string SOL2DEV (see the string in the String Looked For column in portion 400) in a DSX line of the parallel job ATL201FIleReceipt. A portion of the DSX line that includes "sol2dev" is shown in the DSX Line column in FIG. 4. Regarding the second row of data in portion 400, although the DWH_D string in the String Looked For column is not shown in the portion of the DSX line included in the DSX Line column, validation tool 104 (see FIG. 1) finds the string DWH_D in a search of the entire DSX line, thereby detecting a hardcoding violation.

FIG. 5 is an exemplary portion 500 of validation report 110 (see FIG. 1) indicating standards violations determined by the process of FIG. 2, where the report is generated by the system of FIG. 1, in accordance with embodiments of the present invention. Portion 500 includes a list of standards violations determined by validation tool 104 (see FIG. 1). Each violation in the list of standards violations includes a DSX line number, object type, object name, stage name, stage type, violation type and violation description.

For example, the first row of data in portion 500 indicates that for the parallel job AIE001WriteSAPFile, validation tool 104 (see FIG. 1) determines an annotation violation because there is no job annotation for AIE001WriteSAPFile.

Computer System

Figure 6:
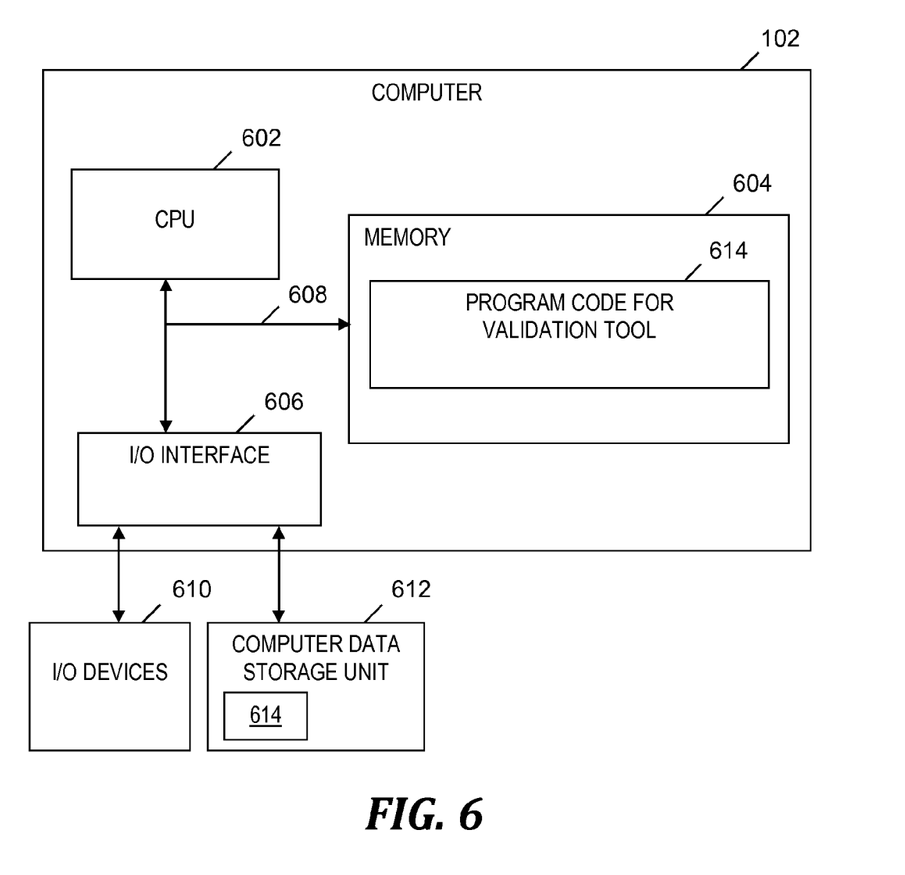
FIG. 6 is a block diagram of a computer that is included in the system of FIG. 1 and that implements the process of FIG. 2, in accordance with embodiments of the present invention.

FIG. 6 is a block diagram of a computer that is included in the system of FIG. 1 and that implements the process of FIG. 2, in accordance with embodiments of the present invention. Computer 102 is a computer system or mobile computing device that generally includes a central processing unit (CPU) 602, a memory 604, an input/output (I/O) interface 606, and a bus 608. Further, computer 102 is coupled to I/O devices 610 and a computer data storage unit 612. CPU 602 performs computation and control functions of computer 102, including carrying out instructions included in program code 614 to perform a method of validating code of an ETL tool, where the instructions are carried out by CPU 602 via memory 604. CPU 602 may include a single processing unit, or be distributed across one or more processing units in one or more locations (e.g., on a client and server). Program code 614 includes program code for validation tool 104 (see FIG. 1).

Memory 604 includes a known computer readable storage medium, which is described below. In one embodiment, cache memory elements of memory 604 provide temporary storage of at least some program code (e.g., program code 614) in order to reduce the number of times code must be retrieved from bulk storage while instructions of the program code are carried out. Moreover, similar to CPU 602, memory 604 may reside at a single physical location, including one or more types of data storage, or be distributed across a plurality of physical systems in various forms. Further, memory 604 can include data distributed across, for example, a local area network (LAN) or a wide area network (WAN).

I/O interface 606 includes any system for exchanging information to or from an external source. I/O devices 610 include any known type of external device, including a display device, keyboard, etc. Bus 608 provides a communication link between each of the components in computer 102, and may include any type of transmission link, including electrical, optical, wireless, etc.

I/O interface 606 also allows computer 102 to store information (e.g., data or program instructions such as program code 614) on and retrieve the information from computer data storage unit 612 or another computer data storage unit (not shown). Computer data storage unit 612 includes a known computer-readable storage medium, which is described below. In one embodiment, computer data storage unit 612 is a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are carried out by CPU 602 via memory 604 to validate code of an ETL tool. Although FIG. 6 depicts memory 604 as including program code 614, the present invention contemplates embodiments in which memory 604 does not include all of code 614 simultaneously, but instead at one time includes only a portion of code 614.

Further, memory 604 includes an operating system (not shown) and may include other systems not shown in FIG. 6.

Storage unit 612 and/or one or more other computer data storage units (not shown) that are coupled to computer 102 may include data store 108 (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to validating code of an ETL tool. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 102) including one or more processors (e.g., CPU 602), wherein the processor(s) carry out instructions contained in the code causing the computer system to validate code of an ETL tool. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of validating code of an ETL tool.

While it is understood that program code 614 for validating code of an ETL tool may be deployed by manually loading directly in client, server and proxy computers (not shown) via loading a computer-readable storage medium (e.g., computer data storage unit 612), program code 614 may also be automatically or semi-automatically deployed into computer 102 by sending program code 614 to a central server or a group of central servers. Program code 614 is then downloaded into client computers (e.g., computer 102) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of validating code of an ETL tool. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 604 and computer data storage unit 612) having computer readable program instructions 614 thereon for causing a processor (e.g., CPU 602) to carry out aspects of the present invention.

The computer readable storage medium (i.e., computer readable storage device) can be a tangible device that can retain and store instructions (e.g., program code 614) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium and a computer readable storage device, as used herein, are not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 614) described herein can be downloaded to respective computing/processing devices (e.g., computer 102) from a computer readable storage medium or to an external computer or external storage device (e.g., computer data storage unit 612) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 614) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 6) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 614).

These computer readable program instructions may be provided to a processor (e.g., CPU 602) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 612) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 614) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of validating code of an extract, transform and load (ETL) tool, the method comprising the steps of:

responsive to a receipt of naming, coding, and performance standards for the code of the ETL tool and an export of the code of the ETL tool to a job definition file, a computer parsing the code of the ETL tool in the job definition file;

the computer determining violations of the naming, coding, and performance standards in part by determining the parsed code of the ETL tool does not match the naming, coding, and performance standards;

the computer generating a report which identifies the violations;

based at least in part on a review of the report and a rework of the code of the ETL tool to comply with the naming, coding and performance standards and responsive to an export of the reworked code of the ETL tool to another job definition file, the computer parsing the reworked code of the ETL tool in the other job definition file, determining that the parsed reworked code of the ETL tool does not include the violations of the naming, coding and performance standards, and generating a second report that indicates that the reworked code of the ETL tool does not include the violations;

the computer determining whether the code of the ETL tool specifies an automatic selection of a partitioning method for a link in the code of the ETL tool;

the computer determining whether first parameter(s) are present in the code of the ETL tool as parameter(s) of a job included in the code of the ETL tool;

the computer determining whether second parameter(s) are not present in the code of the ETL tool as parameter(s) of the job;

the computer determining whether the job is annotated in a description field;

the computer determining whether the description field of the job includes a value specified by a job annotation standard included in the naming, coding, and performance standards;

the computer determining whether the description field includes a name of the job;

the computer determining whether a job activity in a sequence having a parameter passes a value specified by a job activity parameter standard included in the naming, coding, and performance standards;

the computer determining whether an add checkpoints feature is enabled for the sequence so that jobs in the sequence are restartable on failure of the jobs;

the computer determining whether a handle activities that fail feature is enabled for the sequence so that an activity of a failing job in the sequence is handled by triggering automatically inserted code that branches to an error handling point;

the computer determining whether a log job errors feature is enabled for the sequence so that a message is logged about a job whose run ends with a warning or fatal error;

the computer determining whether a log job reports feature is enabled for the sequence so that a status report is logged after a run of the job whose run ends with the warning or fatal error;

the computer determining whether a reset if required and then run feature is enabled for the sequence so that the job is run each time the sequence is run, even after a run of the sequence is aborted;

the computer determining whether a surrogate key is generated in a transformer stage; and based on the code of the ETL tool specifying the automatic selection of the partitioning method for the link in the code of the ETL tool, the first parameter(s) being present in the code of the ETL tool as the parameter(s) of the job, the second parameter(s) not being present in the code of the ETL tool as the parameter(s) of the job, the job not being annotated in the description field, the description field of the job not including the value specified by the job annotation standard, the description field not including the name of the job, the job activity does not pass the value specified by the job activity parameter standard, the add checkpoints feature not being enabled for the sequence, the handle activities that fail feature not being enabled for the sequence, the log job errors feature not being enabled for the sequence, the log job reports feature not being enabled for the sequence, the reset if required and then run feature not being enabled for the sequence, or the surrogate key is generated in the transformer stage, the computer determining a violation of the naming, coding, and performance standards.

2. The method of claim 1, further comprising the steps of:

the computer sending the other job definition file of the approved reworked code of the ETL tool to a quality assurance (QA) environment;

in response to a second rework of the code of the ETL tool based on the other job definition, the computer exporting the code of the ETL tool resulting from the second rework to yet another job definition file, parsing the code of the ETL tool resulting from the second rework, determining that the code of the ETL tool resulting from the second rework does not include the violations of the naming, coding and performance standards, generating a third report that indicates that the code of the ETL tool resulting from the second rework does not include the violations, receiving an approval of the code of the ETL tool resulting from the second rework, and sending a job definition file of the approved code of the ETL tool resulting from the second rework to the QA environment;

the computer receiving an indication of a successful end-to-end run of the ETL tool based on the approved code of the ETL tool resulting from the second rework; and based on the received indication of the successful end-to-end run of the ETL tool, the computer generating release notes for the approved code of the ETL tool resulting from the second rework.

3. The method of claim 1, further comprising the steps of:

the computer determining the code of the ETL tool matches a regular expression specified by a coding standard included in the naming, coding, and performance standards; and based on the code of the ETL tool matching the regular expression, the computer determining the code of the ETL tool includes hardcoding, wherein the step of generating the report includes generating the report which identifies the hardcoding, wherein the step of generating the second report is based in part on a rework of the code of the ETL tool to eliminate the hardcoding, and wherein the second report indicates the reworked code of the ETL tool does not include the hardcoding.

4. The method of claim 1, further comprising the steps of:

the computer determining a name of an object included in the code of the ETL tool;

the computer determining a naming standard of the object includes a regular expression or a sequence of characters that is not a regular expression, the naming standard included in the naming, coding, and performance standards;

if the naming standard of the object includes a regular expression, the computer determining a name of the object does not match the regular expression, or if the naming standard of the object includes the sequence of characters, the computer determining the name of the object does not begin with the sequence of characters; and based on the name of the object not matching the regular expression or not beginning with the sequence of characters, the computer determining a violation of the naming standard, which is included in the violations of the naming, coding, and performance standards.

5. The method of claim 1, further comprising the steps of:

the computer receiving maximum numbers of aggregator stages of a job included in the code of the ETL tool, transformer stages of the job, occurrences of repartitioning of data sets in the job, sort stages of the job, database read/write operations of the job, and sequential file read/write operations of the job;

the computer receiving a minimum ratio of a number of stages of the job to a number of stages of the job that are annotated;

the computer receiving minimum sizes of a transaction for any insert, update or delete operation of the job and an array employed for any insert, update or delete operation of the job; and based on aggregator stages of the job exceeding the maximum number of aggregator stages, transformer stages of the job exceeding the maximum number of transformer stages of the job, occurrences of repartitioning of data sets in the job exceeding the maximum number of occurrences of repartitioning of data sets in the job, sort stages of the job exceeding the maximum number of sort stages, database read/write operations of the job exceeding the maximum number of database read/write operations, sequential file read/write operations of the job exceeding the maximum number of sequential file read/write operations, a ratio of the number of stages of the job to the number of stages of the job that are annotated being less than the minimum ratio of the number of stages to the number of stages that are annotated, a size of a transaction for an insert, update or delete operation of the job being less than the minimum size of the transaction, or a size of an array employed for an insert, update or delete operation of the job being less than the minimum size of the array, the computer determining a violation of a performance standard included in the naming, coding, and performance standards.

6. The method of claim 1, further comprising the step of the computer determining job names, stage names, stage types, violation types, and descriptions of the violations, wherein the step of generating the report includes generating the report to include the job names, stage names, stage types, violation types and descriptions of the violations.

7. The method of claim 1, further comprising the step of:
providing at least one support service for at least one of creating, integrating, hosting, maintaining, and deploying computer-readable program code in the computer system, the program code being executed by a processor of the computer system to implement the steps of parsing the code of the ETL tool, determining the violations, generating the report, parsing the reworked code of the ETL tool, determining that the parsed reworked code of the ETL tool does not include the violations, generating the second report, determining whether the code of the ETL tool specifies the automatic selection of the partitioning method, determining whether the first parameter(s) are present in the code of the ETL tool, determining whether the second parameter(s) are not present in the code of the ETL tool, determining whether the job is annotated in the description field, determining whether the description field includes the value specified by the job annotation standard, determining whether the description field includes the name of the job, determining whether the job activity in the sequence passes the value specified by the job activity parameter standard, determining whether the add checkpoints feature is enabled for the sequence, determining whether the handle activities that fail feature is enabled for the sequence, determining whether the log job errors feature is enabled for the sequence, determining whether the log job reports feature is enabled for the sequence, determining whether the reset if required and then run feature is enabled for the sequence, determining whether the surrogate key is generated in the transformer stage, determining the violation.

8. A computer system comprising:
a central processing unit (CPU);
a memory coupled to the CPU; and
a computer-readable storage device coupled to the CPU, the storage device containing instructions that are executed by the CPU via the memory to implement a method of validating code of an extract, transform and load (ETL) tool, the method comprising the steps of:
responsive to a receipt of naming, coding, and performance standards for the code of the ETL tool and an export of the code of the ETL tool to a job definition file, the computer system parsing the code of the ETL tool in the job definition file;
the computer system determining violations of the naming, coding, and performance standards in part by determining the parsed code of the ETL tool does not match the naming, coding, and performance standards;
the computer system generating a report which identifies the violations;
based at least in part on a review of the report and a rework of the code of the ETL tool to comply with the naming, coding and performance standards and responsive to an export of the reworked code of the ETL tool to another job definition file, the computer system parsing the reworked code of the ETL tool in the other job definition file, determining that the parsed reworked code of the ETL tool does not include the violations of the naming, coding and performance standards, and generating a second report that indicates that the reworked code of the ETL tool does not include the violations;
the computer system determining whether the code of the ETL tool specifies an automatic selection of a partitioning method for a link in the code of the ETL tool;
the computer system determining whether first parameter(s) are present in the code of the ETL tool as parameter(s) of a job included in the code of the ETL tool;
the computer system determining whether second parameter(s) are not present in the code of the ETL tool as parameter(s) of the job;
the computer system determining whether the job is annotated in a description field;
the computer system determining whether the description field of the job includes a value specified by a job annotation standard included in the naming, coding, and performance standards;
the computer system determining whether the description field includes a name of the job;
the computer system determining whether a job activity in a sequence having a parameter passes a value specified by a job activity parameter standard included in the naming, coding, and performance standards;
the computer system determining whether an add checkpoints feature is enabled for the sequence so that jobs in the sequence are restartable on failure of the jobs;
the computer system determining whether a handle activities that fail feature is enabled for the sequence so that an activity of a failing job in the sequence is handled by triggering automatically inserted code that branches to an error handling point;
the computer system determining whether a log job errors feature is enabled for the sequence so that a message is logged about a job whose run ends with a warning or fatal error;
the computer system determining whether a log job reports feature is enabled for the sequence so that a status report is logged after a run of the job whose run ends with the warning or fatal error;
the computer system determining whether a reset if required and then run feature is enabled for the sequence so that the job is run each time the sequence is run, even after a run of the sequence is aborted;
the computer system determining whether a surrogate key is generated in a transformer stage; and
based on the code of the ETL tool specifying the automatic selection of the partitioning method for the link in the code of the ETL tool, the first parameter(s) being present in the code of the ETL tool as the parameter(s) of the job, the second parameter(s) not being present in the code of the ETL tool as the parameter(s) of the job, the job not being annotated in the description field, the description field of the job not including the value specified by the job annotation standard, the description field not including the name of the job, the job activity does not pass the value specified by the job activity parameter standard, the add checkpoints feature not being enabled for the sequence, the handle activities that fail feature not being enabled for the sequence, the log job errors feature not being enabled for the sequence, the log job reports feature not being enabled for the sequence, the reset if required and then run feature not being enabled for the sequence, or the surrogate key is generated in the transformer stage, the computer system determining a violation of the naming, coding, and performance standards.

9. The computer system of claim 8, wherein the method further comprises the steps of:
the computer system sending the other job definition file of the approved reworked code of the ETL tool to a quality assurance (QA) environment;
in response to a second rework of the code of the ETL tool based on the other job definition, the computer system exporting the code of the ETL tool resulting from the second rework to yet another job definition file, parsing the code of the ETL tool resulting from the second rework, determining that the code of the ETL tool resulting from the second rework does not include the violations of the naming, coding and performance standards, generating a third report that indicates that the code of the ETL tool resulting from the second rework does not include the violations, receiving an approval of the code of the ETL tool resulting from the second rework, and sending a job definition file of the approved code of the ETL tool resulting from the second rework to the QA environment;
the computer system receiving an indication of a successful end-to-end run of the ETL tool based on the approved code of the ETL tool resulting from the second rework; and
based on the received indication of the successful end-to-end run of the ETL tool, the computer system generating release notes for the approved code of the ETL tool resulting from the second rework.

10. The computer system of claim 8, wherein the method further comprises the steps of:
the computer system determining the code of the ETL tool matches a regular expression specified by a coding standard included in the naming, coding, and performance standards; and
based on the code of the ETL tool matching the regular expression, the computer system determining the code of the ETL tool includes hardcoding, wherein the step of generating the report includes generating the report which identifies the hardcoding, wherein the step of generating the second report is based in part on a rework of the code of the ETL tool to eliminate the hardcoding, and wherein the second report indicates the reworked code of the ETL tool does not include the hardcoding.

11. The computer system of claim 8, wherein the method further comprises the steps of:
the computer system determining a name of an object included in the code of the ETL tool;
the computer system determining a naming standard of the object includes a regular expression or a sequence of characters that is not a regular expression, the naming standard included in the naming, coding, and performance standards;
if the naming standard of the object includes a regular expression, the computer system determining a name of the object does not match the regular expression, or if the naming standard of the object includes the sequence of characters, the computer system determining the name of the object does not begin with the sequence of characters; and
based on the name of the object not matching the regular expression or not beginning with the sequence of characters, the computer system determining a violation of the naming standard, which is included in the violations of the naming, coding, and performance standards.

12. The computer system of claim 8, wherein the method further comprises the steps of:
the computer system receiving maximum numbers of aggregator stages of a job included in the code of the ETL tool, transformer stages of the job, occurrences of repartitioning of data sets in the job, sort stages of the job, database read/write operations of the job, and sequential file read/write operations of the job;
the computer system receiving a minimum ratio of a number of stages of the job to a number of stages of the job that are annotated;
the computer system receiving minimum sizes of a transaction for any insert, update or delete operation of the job and an array employed for any insert, update or delete operation of the job; and
based on aggregator stages of the job exceeding the maximum number of aggregator stages, transformer stages of the job exceeding the maximum number of transformer stages of the job, occurrences of repartitioning of data sets in the job exceeding the maximum number of occurrences of repartitioning of data sets in the job, sort stages of the job exceeding the maximum number of sort stages, database read/write operations of the job exceeding the maximum number of database read/write operations, sequential file read/write operations of the job exceeding the maximum number of sequential file read/write operations, a ratio of the number of stages of the job to the number of stages of the job that are annotated being less than the minimum ratio of the number of stages to the number of stages that are annotated, a size of a transaction for an insert, update or delete operation of the job being less than the minimum size of the transaction, or a size of an array employed for an insert, update or delete operation of the job being less than the minimum size of the array, the computer system determining a violation of a performance standard included in the naming, coding, and performance standards.

13. A computer program product, comprising:
a computer-readable storage device; and
a computer-readable program code stored in the computer-readable storage device, the computer-readable program code containing instructions that are executed by a central processing unit (CPU) of a computer system to implement a method of validating code of an extract, transform and load (ETL) tool, the method comprising the steps of:
responsive to a receipt of naming, coding, and performance standards for the code of the ETL tool and an export of the code of the ETL tool to a job definition file, the computer system parsing the code of the ETL tool in the job definition file;
the computer system determining violations of the naming, coding, and performance standards in part by determining the parsed code of the ETL tool does not match the naming, coding, and performance standards;
the computer system generating a report which identifies the violations;
based at least in part on a review of the report and a rework of the code of the ETL tool to comply with the naming, coding and performance standards and responsive to an export of the reworked code of the ETL tool to another job definition file, the computer system parsing the reworked code of the ETL tool in the other job definition file, determining that the parsed reworked code of the ETL tool does not
include the violations of the naming, coding and performance standards, and generating a second report
that indicates that the reworked code of the ETL tool
does not include the violation;
the computer system determining whether the code of
the ETL tool specifies an automatic selection of a
partitioning method for a link in the code of the ETL
tool;
the computer system determining whether first parameter(s) are present in the code of the ETL tool as
parameter(s) of a job included in the code of the ETL
tool;
the computer system determining whether second
parameter(s) are not present in the code of the ETL
tool as parameter(s) of the job;
the computer system determining whether the job is
annotated in a description field;
the computer system determining whether the description field of the job includes a value specified by a job
annotation standard included in the naming, coding,
and performance standards;
the computer system determining whether the description field includes a name of the job;
the computer system determining whether a job activity
in a sequence having a parameter passes a value specified by a job activity parameter standard included in
the naming, coding, and performance standards;
the computer system determining whether an add checkpoints feature is enabled for the sequence so that jobs
in the sequence are restartable on failure of the jobs;
the computer system determining whether a handle
activities that fail feature is enabled for the sequence
so that an activity of a failing job in the sequence is
handled by triggering automatically inserted code
that branches to an error handling point;
the computer system determining whether a log job
errors feature is enabled for the sequence so that a
message is logged about a job whose run ends with a
warning or fatal error;
the computer system determining whether a log job
reports feature is enabled for the sequence so that a
status report is logged after a run of the job whose run
ends with the warning or fatal error;
the computer system determining whether a reset if
required and then run feature is enabled for the
sequence so that the job is run each time the sequence
is run, even after a run of the sequence is aborted;
the computer system determining whether a surrogate
key is generated in a transformer stage; and
based on the code of the ETL tool specifying the automatic selection of the partitioning method for the link
in the code of the ETL tool, the first parameter(s)
being present in the code of the ETL tool as the parameter(s) of the job, the second parameter(s) not being
present in the code of the ETL tool as the parameter(s)
of the job, the job not being annotated in the description field, the description field of the job not including
the value specified by the job annotation standard, the
description field not including the name of the job, the
job activity does not pass the value specified by the job
activity parameter standard, the add checkpoints feature not being enabled for the sequence, the handle
activities that fail feature not being enabled for the
sequence, the log job errors feature not being enabled
for the sequence, the log job reports feature not being
enabled for the sequence, the reset if required and then
run feature not being enabled for the sequence, or the
surrogate key is generated in the transformer stage,
the computer system determining a violation of the
naming, coding, and performance standards.

14. The computer program product of claim 13, wherein
the method further comprises the steps of:
the computer system sending the other job definition file of
the approved reworked code of the ETL tool to a quality
assurance (QA) environment;
in response to a second rework of the code of the ETL tool
based on the other job definition, the computer system
exporting the code of the ETL tool resulting from the
second rework to yet another job definition file, parsing
the code of the ETL tool resulting from the second
rework, determining that the code of the ETL tool resulting from the second rework does not include the violations of the naming, coding and performance standards,
generating a third report that indicates that the code of
the ETL tool resulting from the second rework does not
include the violations, receiving an approval of the code
of the ETL tool resulting from the second rework, and
sending a job definition file of the approved code of the
ETL tool resulting from the second rework to the QA
environment;
the computer system receiving an indication of a successful
end-to-end run of the ETL tool based on the approved
code of the ETL tool resulting from the second rework;
and
based on the received indication of the successful end-to-end run of the ETL tool, the computer system generating
release notes for the approved code of the ETL tool
resulting from the second rework.

15. The computer program product of claim 13, wherein
the method further comprises the steps of:
the computer system determining the code of the ETL tool
matches a regular expression specified by a coding standard included in the naming, coding, and performance
standards; and
based on the code of the ETL tool matching the regular
expression, the computer system determining the code
of the ETL tool includes hardcoding, wherein the step of
generating the report includes generating the report
which identifies the hardcoding, wherein the step of
generating the second report is based in part on a rework
of the code of the ETL tool to eliminate the hardcoding,
and wherein the second report indicates the reworked
code of the ETL tool does not include the hardcoding.

16. The computer program product of claim 13, wherein
the method further comprises the steps of:
the computer system determining a name of an object
included in the code of the ETL tool;
the computer system determining a naming standard of the
object includes a regular expression or a sequence of
characters that is not a regular expression, the naming
standard included in the naming, coding, and performance standards;
if the naming standard of the object includes a regular
expression, the computer system determining a name of
the object does not match the regular expression, or if the
naming standard of the object includes the sequence of
characters, the computer system determining the name
of the object does not begin with the sequence of characters; and
based on the name of the object not matching the regular
expression or not beginning with the sequence of characters, the computer system determining a violation of the naming standard, which is included in the violations of the naming, coding, and performance standards.

17. The computer program product of claim 13, wherein the method further comprises the steps of:
the computer system receiving maximum numbers of aggregator stages of a job included in the code of the ETL tool, transformer stages of the job, occurrences of repartitioning of data sets in the job, sort stages of the job, database read/write operations of the job, and sequential file read/write operations of the job;
the computer system receiving a minimum ratio of a number of stages of the job to a number of stages of the job that are annotated;
the computer system receiving minimum sizes of a transaction for any insert, update or delete operation of the job and an array employed for any insert, update or delete operation of the job; and
based on aggregator stages of the job exceeding the maximum number of aggregator stages, transformer stages of the job exceeding the maximum number of transformer stages of the job, occurrences of repartitioning of data sets in the job exceeding the maximum number of occurrences of repartitioning of data sets in the job, sort stages of the job exceeding the maximum number of sort stages, database read/write operations of the job exceeding the maximum number of database read/write operations, sequential file read/write operations of the job exceeding the maximum number of sequential file read/write operations, a ratio of the number of stages of the job to the number of stages of the job that are annotated being less than the minimum ratio of the number of stages to the number of stages that are annotated, a size of a transaction for an insert, update or delete operation of the job being less than the minimum size of the transaction, or a size of an array employed for an insert, update or delete operation of the job being less than the minimum size of the array, the computer system determining a violation of a performance standard included in the naming, coding, and performance standards.

* * * * *